Jan. 19, 1943.  G. P. BOSOMWORTH  2,308,948
VULCANIZER
Filed Aug. 17, 1938  3 Sheets-Sheet 1

INVENTOR
GEORGE P. BOSOMWORTH
BY Ely & Frye
ATTORNEYS

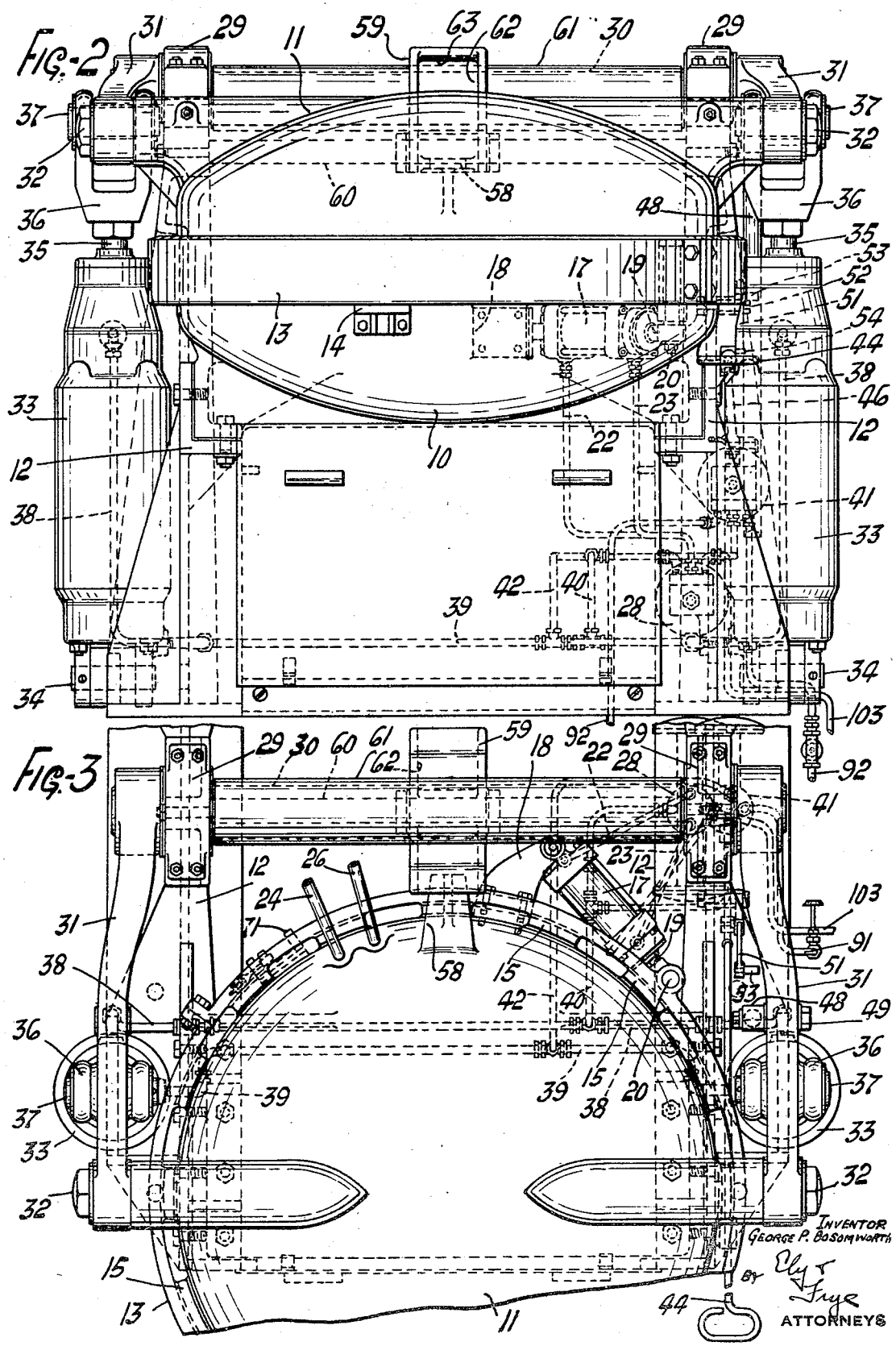

Jan. 19, 1943.   G. P. BOSOMWORTH   2,308,948
VULCANIZER
Filed Aug. 17, 1938   3 Sheets-Sheet 3

INVENTOR
GEORGE P. BOSOMWORTH
BY   Ely & Frye
ATTORNEYS

Patented Jan. 19, 1943

2,308,948

UNITED STATES PATENT OFFICE 2,308,948

VULCANIZER

George P. Bosomworth, Akron, Ohio, assignor to The Firestone Tire & Rubber Company, Akron, Ohio, a corporation of Ohio Application August 17, 1938, Serial No. 225,307

2 Claims. (Cl. 18—17)

This invention relates to vulcanizers of the watchcase type such as are used in the rubber industry for the manufacture of pneumatic tire casings, inner tubes, and the like, and more especially it relates to safety mechanism for vulcanizers of the character mentioned, which vulcanizers have covers requiring to be raised and lowered to effect opening and closing of the vulcanizer.

The chief object of the invention is to assure the safety of the operator of the vulcanizer. A further object is to provide simplified control mechanism for the vulcanizer whereby two-way control of one of its valves is effected by means of a single control in a timer mechanism, thus making for simplicity of the latter. More specifically, the invention aims to provide improved mechanical means that positively prevents the lowering of the cover of the vulcanizer under all conditions except when it is intentionally lowered; to provide means for automatically locking the vulcanizer cover in closed position, which means cannot function until the cover is lowered; and to provide means for preventing the admission of pressure fluid to the expansible core in the work in the vulcanizer until after the vulcanizer cover is locked in closed position. Other objects will be manifest as the specification proceeds.

Of the accompanying drawings:

Figure 2 is a front elevation thereof in closed position with the cover lowered;

Figure 3 is a plan view of the structure shown in Figure 2, a portion at the front of the vulcanizer being broken away;

Figure 1:
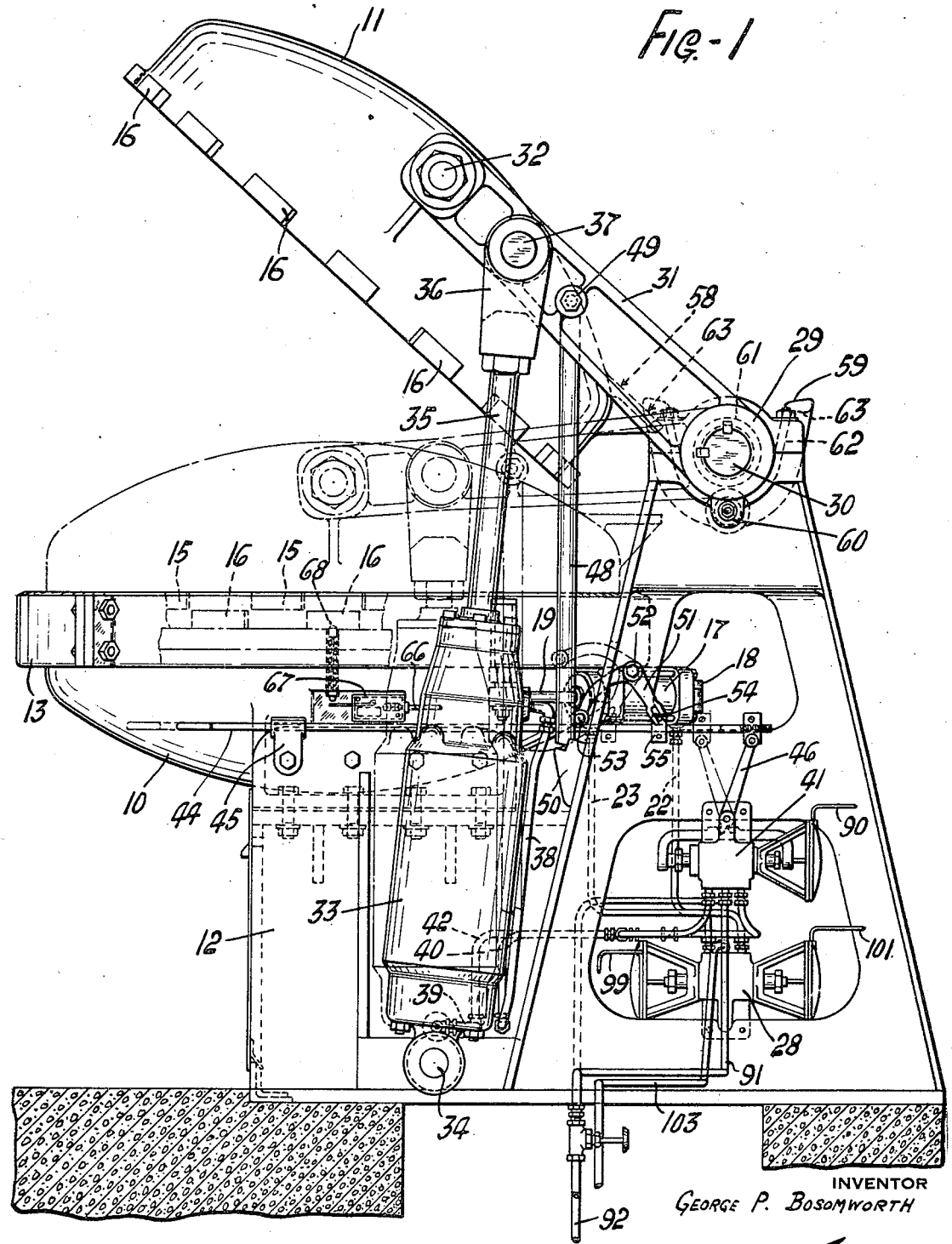
Figure 1 is a side elevation of a vulcanizer embodying the invention, in open position with its cover raised.

Referring to the drawings, there is shown a vulcanizer comprising a stationary concavo-convex section 10 and a similarly shaped movable section or cover 11, said sections being arranged to part on a horizontal plane, the cover section 11 being uppermost. The stationary section 10 is mounted upon a pair of frame members or standards 12, 12 that are positioned at opposite sides of the section, and extend somewhat beyond the rear thereof. The marginal portion of section 10, which is at the top thereof, is circumscribed by an annular locking ring 13 that rests upon brackets, such as the bracket 14, Figure 2, carried by the said vulcanizer section. The locking ring is formed with the usual inwardly extending bayonet lugs 15, 15 that co-operate with bayonet lugs 16, 16 on the lower marginal portion of the cover 11 for locking the vulcanizer in the closed or operative condition thereof shown in Figures 2 and 3. For moving the locking ring 13 angularly a power operated device is employed, said device comprising a double acting fluid pressure operated cylinder 17 that is pivotally connected at one end to a bracket arm 18 that is secured to a sidewall of the stationary section 10, the piston rod 19 of said cylinder extending from the opposite end thereof and being pivotally connected at 20 to the locking ring 13. The piston rod 19 is projected outwardly to turn the locking ring to unlocked position, and retracted to turn the locking ring to locked position. The cylinder 17 is provided with fluid inlet and outlet ports at opposite ends thereof, said ports being connected by suitable pipes to a four-way fluid pressure operated, double diaphragm valve 28 that controls the admission of fluid to the cylinder and the evacuation of fluid therefrom. The pipe that connects with the rear end of the cylinder is designated 22 and the pipe that connects with the front end thereof is designated 23. The admission of pressure fluid to the cylinder 17 is effected automatically and in determinate time-relation to the operation of other elements of the apparatus, as presently will be explained. Removably mounted within the vulcanizer sections 10, 11 are the respective mating sections of a two part cavity mold (not shown) within which the work is vulcanized. Said mold sections are of the steam-jacketed type, and steam for heating same is conducted to the vulcanizer through pipe 24 and conducted therefrom through pipe 25, a flexible pipe 26 being provided for conducting the steam from one mold section to the other.

Upon the top of each standard 12, rearwardly of the vulcanizer, is a bearing structure 29, and a heavy shaft 30 is journaled in said bearings 29 adjacent its respective ends. The end portions of shaft 30 project laterally of the respective bearings, and secured to said projecting end portions are respective lever arms 31, 31. The latter extend forwardly from the shaft 30 and have their free ends pivotally connected at 32 to the vulcanizer cover 11, the pivots 32 being disposed at diametrically opposite points of said cover. The lever arms 31 are swingable so as to move the cover 11 between the closed position shown in Figures 2 and 3 of the drawings and the open position shown in full lines in Figure 1 thereof, the shaft being so positioned that its axis is slightly above the axis of the pivots 32 when the cover is in closed position, as is indicated in broken lines in Figure 1. Since the cover is pivotally mounted in the ends of lever arms 31, it will be apparent that the cover will be in parallelism with the stationary section 10 during the initial phase of its movement of separation therefrom, and during the final phase of its closing movement therewith. Furthermore, because of the angular position of the lever arms 31, the cover will vary but slightly from axial alignment with the section 10 during said initial opening and final closing movement. The arrangement is such as to avoid the pinching or displacement of the work in the vulcanizer during the closing of the latter.

Figure 5:
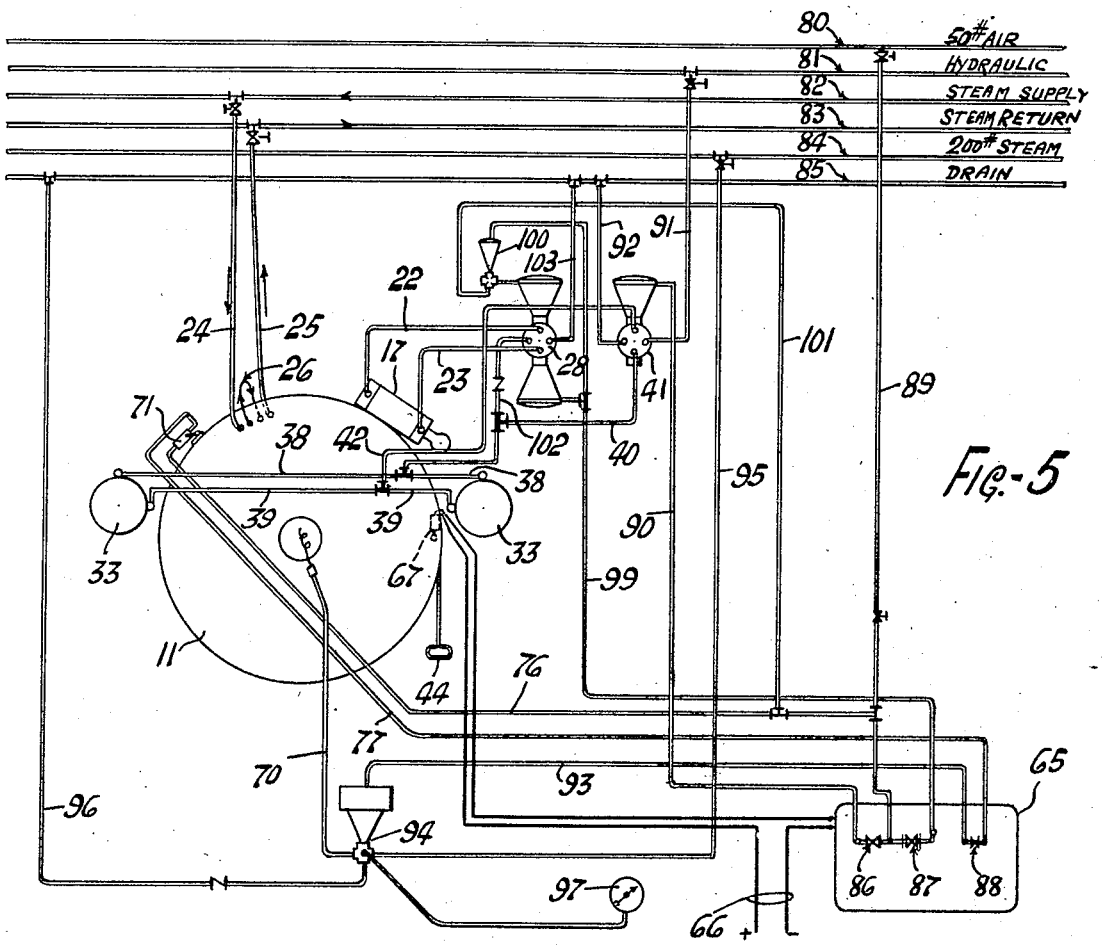
Figure 5 is a piping diagram of the apparatus, including electrical means for operating the timer.

For raising and lowering the lever arms 31 to open and close the vulcanizer, a pair of double acting fluid pressure cylinders 33, 33 are provided. The cylinders 33 are positioned at opposite sides of the vulcanizer, substantially in vertical position, and each is pivoted at 34, at its lower end, upon a portion of the standard 12 thereat. The respective piston rods 35 of said cylinders extend upwardly therefrom and have their outer ends provided with respective clevises 36 that are pivotally connected at 37 to the lever arms 31, between pivot points 32 and the shaft 30, said lever arms thus constituting levers of the third class. Flexible inlet and outlet pipes 38, 39 communicate with the upper and lower ends respectively of the cylinders 33, said pipes 38 connecting with each other and with a pipe 40 that extends to a four-way single diaphragm operated valve 41 that is pressure operated in one direction and manually operated in the other direction as presently will be described. In like manner the pipes 39 connect with each other and with a pipe 42 that also connects with the valve 41, as is best shown in Figure 5. The valve 41 is arranged to be manually operated, when the vulcanizer is open, to effect the lowering of the cover 11 to close the vulcanizer. To this end an operating rod 44 is provided, which rod extends to the front of the vulcanizer in position to be grasped by the operator. The rod 44 is slidably mounted in a supporting bracket 45 on the side of the near standard 12 as viewed in Figure 1, the rear end of said rod being adjustably connected to an angularly movable operating lever 46 on the valve 41. The operating rod 44 is in position shown in full lines in Figure 1 when the vulcanizer is open, and is manually pulled forwardly to the broken line position shown to effect the lowering of the cover 11.

The vulcanizer comprises mechanical safety mechanism that automatically moves into operative position, when the cover rises to its elevated position, to prevent descent of the cover in case of failure of the fluid pressure supply to the cylinders 33, said safety mechanism being automatically moved to inoperative position, to enable descent of the vulcanizer cover, when the operating rod 44 is pulled forwardly to operate valve 41. Said safety mechanism comprises a strut 48 that automatically is positioned between one of the lever arms 31 and a fixed abutment when the cover 11 is in elevated position. The strut 48 is an elongated metal bar of cylindrical section that is pivotally connected at 49, at its upper end, to the inner face of lever arm 31 that is on the near side of the machine is viewed in Figure 1. The lower end of strut 48 is notched, and is engagable with a stepped abutment 50 that is positioned upon a flange of a standard 12 when the cover 11 is in elevated position as shown in Figure 1. The pivot 49 is so arranged that the strut may oscillate thereon in a fore and aft direction.

When the strut is in the operative position shown in Figure 1, it positively prevents descent of the cover 11 due to failure of the cylinders 33. It is necessary that the strut be moved to alternative position, out of engagement with abutment 50, before the upper ends of cylinders 33 are charged to effect the lowering of cover 11, and to this end means is provided for swinging the strut on its pivot to move its lower end off said abutment. This is accomplished by means of a bellcrank 51 that is pivotally mounted at its elbow, at 52, upon standard 12 that is on the near side of the machine as viewed in Figure 1. One arm of said bell-crank is provided at its end with a laterally projecting pin 53 that is engageable with strut 48. The other arm of bell-crank 51 is forked or slotted at its free end and straddles a pin 54 carried by fixture 55 that is adjustably mounted upon the operating rod 44. The arrangement is such that when the operating rod is drawn forwardly, to operate the valve 41 so as to effect the closing of the vulcanizer, the pin 54 will cause angular movement of the bell crank 51 about its pivot 52, as indicated in broken lines in Figure 1, so that pin 53 thereof will push the lower end of strut 48 off the abutment 50, before valve 41 is turned sufficiently to effect operation of cylinders 33, and hold said strut out of alignment with said abutment as the lever arms 31 descend.

As previously stated, the vulcanizer cover is in parallelism with the stationary section 10 during the initial phase of its rising or opening movement. It is desirable, however, that in fully open position the cover should be tilted so as to be more accessible for the cleaning of the mold section therein. To this end a lug 58 is formed on the top of the cover, at the rear thereof, said lug projecting beyond the perimeter of the cover, as shown in Figures 1 and 3. The lug 58 is arranged to be engaged by a stationary abutment member, as the cover is lifted by the arms 31, to effect the tilting of the cover. Said abutment member, which is designated 59, is a generally U-shaped structure that is carried by a horizontal supporting rod 60 that is disposed below the shaft 30 and carried by the standards 12. The abutment member 59 partly embraces the shaft 30, the latter having a sleeve 61 mounted thereon so that the abutment member may bear against the same and thus be prevented from turning angularly about its supporting rod 60. The abutment member 59 is formed exteriorly with a longitudinally extending groove 62 that serves as a guide for the lug 58, the end of the groove, at one end at least, being obstructed by an overhanging lip 63. Engagement of the lug 58 with the lip 63, during the rising movement of the cover, prevents further rise of the cover at the rear thereof, and causes the cover to tilt about the lip as a pivot so that when the lever arms 31 are fully raised the cover is in the angular position shown in full lines in Figure 1.

The operation of the vulcanizer is substantially fully automatic, requiring only that the operating rod 44 be pulled forward to initiate a cycle of operation. The sequence of operations and the duration thereof are controlled automatically by means of an electrically operated timing device 65 of well known design that is indicated diagrammatically in Figure 5, power for operating said timer being supplied by the electrical conductors 66. As a safety measure, a switch 67 is interposed in the electrical connections 66 for closing the same to set the timer in operation, said switch being mounted upon the stationary vulcanizer section 10 as shown in Figure 1. The switch 67 has an operating lever that is operated by a plunger 68, the latter also being mounted upon the section 10 and projecting upwardly therefrom so as to be depressed, to close the switch 67, by the cover 11 when the latter is in fully closed position. A compression spring normally urges the plunger 68 upwardly. The arrangement is such that the timer 65 cannot operate until the cover 11 is fully lowered onto the stationary section 10.

Figure 4:
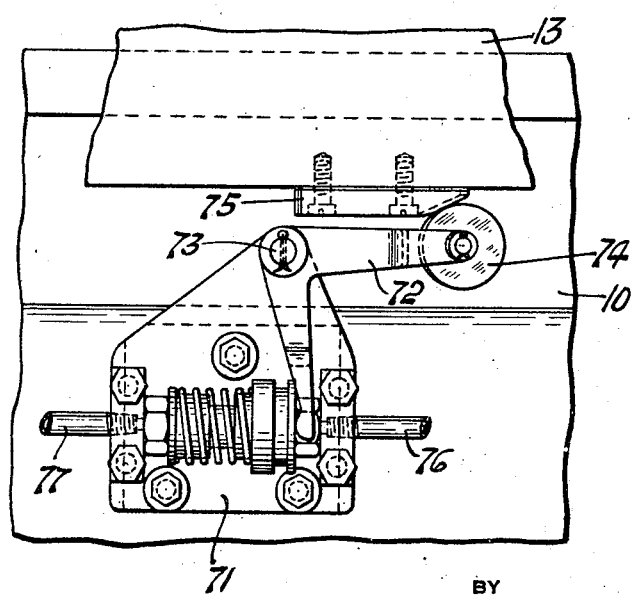
Figure 4 is a detail elevation, on a larger scale, of one of the valves of the apparatus.

During the vulcanizing of a tire in the vulcanizer, steam under 200# pressure is introduced into an expansible core in the tire to distend the latter against the mold, and to supplement the steam that enters the vulcanizer through pipe 24 for vulcanizing the tire. The steam that enters the expansible core is introduced into the vulcanizer through pipe 70, Figure 5. It is extremely important that the vulcanizer be closed, and locked by means of the locking ring 13, before steam is admitted through pipe 70 to the expansible core, and for this reason a safety device in the form of a valve 71 is employed. As shown most clearly in Figure 4, the valve 71 is mounted upon the outside wall of stationary section 10, said valve comprising an angular operating lever 72 that is pivoted at 73 on the valve housing. One arm of lever 72 is provided with a cam roller 74 that is disposed in the path of a cam 75 secured to the under side of locking ring 13. The arrangement is such that when the locking ring is rotated to effect locking of the vulcanizer, cam 75 will engage cam roller 74 and depress the corresponding end of lever 72, as shown in Figure 4, with the result that the other end of the operating lever is moved to effect the opening of the valve 71. Valve 71 is an air valve, the air being conducted thereto through pipe 76 and conducted therefrom, when the valve is opened, through pipe 77. The relation of the safety valve 71 to the flow of steam through pipe 70 presently will be explained.

Attention now is directed to Figure 5 of the drawings wherein is shown the piping diagram of the vulcanizer whereby the various automatic operations thereof are effected in proper sequence. Shown therein are a plurality of pipe lines by which the several fluids are supplied to the vulcanizer. Said pipe lines comprise an air supply line 80 under 50# pressure, a hydraulic supply line 81 for the operation of the cylinders 33, a steam supply line 82 for supplying vulcanizing fluid to the mold sections in the vulcanizer, a steam return line 83 therefor, a steam supply line 84 under 200# pressure for the expansible core, and a drain 85. Within the timer 65 are three three-way fluid control valves 86, 87 and 88 respectively, which valves are opened and closed in determinate sequence, and for the proper duration of time, by the electrically driven timer mechanism. Pipe 89 from the air supply line 80 conducts the 50# air supply to both valves 86 and 87. From valve 86 extends a pipe 90 to the operating diaphragm of four-way valve 41. Hydraulic pressure is supplied to valve 41 through pipe 91 that connects with hydraulic supply pipe 81, said valve also having connection with drain 85 through pipe 92. Inlet pipe 76 to the safety valve 71 is connected with pipe 89 whereby the air pressure is conducted to said valve. Outlet pipe 77 of valve 71 connects to one side of timer valve 88, the other side of said valve 88 being connected by pipe 93 to the operating diaphragm of a three-way valve 94 to which the steam pipe 70 from the expansible core is connected. Steam is conducted to valve 94 from supply line 84 by pipe 95, and an exhaust pipe 96 extends from valve 94 to drain 85. Valve 94 may be provided with a pressure gauge 97 if desired.

From timer valve 87 a pipe 99 extends to one operating diaphragm of four-way valve 28, and also to the operating diaphragm of a three-way pilot valve 100 that is mounted in an air pressure pipe line 101 that is connected at one end to pipe 76 (or any other source of air pressure) and at its other end is connected to the other operating diaphragm of valve 28. As previously stated, pipes 22, 23 of the locking cylinder 17 connect with valve 28. Said valve also has connection with pipe 40 by means of pipe 102, and has connection with drain 85 through pipe 103. The pipes 24, 25 that supply steam to the mold within the vulcanizer are connected to steam supply and return pipes 82, 83 respectively.

The operation of the apparatus is as follows: Assuming that the vulcanizer is in the inoperative, open condition shown in Figure 1, the valve 41 is in the position that enables hydraulic pressure from line 81 to be delivered through pipe 91 and through pipes 42 and 39 to the lower ends of the cylinders 33, 33 and thereby to support the vulcanizer cover 11 in open position. In this position of the cover the lower end of strut 48 rests upon abutment 50 to prevent lowering of the cover due to any failure in the fluid pressure lines. After an unvulcanized tire is mounted in the vulcanizer, the latter is ready for the start of an operative cycle. This is accomplished simply by the pulling forwardly of the operating rod 44.

The immediate result of the forward movement of rod 44 is to turn bell-crank 51 on its pivot 52 and thereby to push the lower end of strut 48 off its abutment 50. Concurrently the forward movement of rod 44 swings the operating lever 46 of valve 41 from the position shown in full lines in Figure 1 to the position shown in broken lines therein, with the result that the valve mechanism is reversed to enable the lower ends of cylinders 33 to discharge through pipes 39, 42 and 92 to the drain 85, and causing the upper ends thereof to be charged through the pipes 40 and 38 from said valve 41. This causes retraction of piston rods 35 and thereby lowers cover 11 onto the stationary vulcanizer section. As the cover comes to rest in its lowered position it depresses plunger 68 to effect the closing of switch 67 in the electrical conductors 66, and thereby to start the motor drive of the timer 65. The first result of the operation of the timer is to open valve 87 thereby causing 50# air pressure from lines 80, 89 to flow to one diaphragm of valve 28 to turn the latter to the position which enables hydraulic pressure, that reaches the valve through pipe 102, to flow therefrom through pipe 22 to the rear end of locking cylinder 17, and to operate the latter to turn the locking ring 13 in the direction that locks the vulcanizer. The arrangement constitutes a safety feature since the cover 11 must be closed before sufficient pressure builds up in pipe 40 to effect the operation of cylinder 17 as described. During this operation, the air pressure of pipe 99 also flows to the valve 100 and holds the latter in closed position so as to shut off the flow of air to the other diaphragm of valve 28 through pipe 101.

The turning of ring 13 to locking position causes cam 75 to open valve 71 thereby enabling the 50# air pressure from pipe 80 to reach timer valve 88 through the agency of pipes 76 and 77. Thereafter, the timer mechanism opens timer valve 88 so that said air pressure flows through pipe 93 to diaphragm valve 94 to open the latter with the result that 200# steam from the pipe 84 is enabled to pass from pipe 95 to pipe 78 and from there into the expansible core in the tire within the vulcanizer. The arrangement constitutes another safety feature that prevents the steam pressure from reaching the expansible core until the vulcanizer is fully locked by the locking ring 13. Steam constantly flows to and from the mold sections within the vulcanizer through the agency of pipes 24, 25 and 26. The present condition of the vulcanizer is maintained for a sufficient interval to effect vulcanization of the work therein, the timer 65 being set to permit the proper lapse of time before again actuating the various valves to terminate the operative cycle.

In the opening of the vulcanizer, timer 65 first closes valve 88, thereby causing valve 94 to reverse its position to shut off the flow of pressure steam to the expansible core, and enabling the latter to evacuate through pipe 96 to the drain 85. The timer next closes valve 87 with the result that pressure to pipe 99 is shut off, and causing valve 100 to return to normal position. This enables the entrapped air in pipe 99 to exhaust through valve 100 to the atmosphere, and also enables air pressure in pipe 101 to flow into diaphragm valve 28 to reverse the position thereof. This causes discharge of the rear end of locking cylinder 17, through pipes 22, 103, to the drain 85, and currently causes the charging of the front end thereof through pipe 23, whereby said cylinder effects the turning of locking ring 13 to effect the unlocking of the vulcanizer. Thereafter timer valve 86 is opened momentarily to reverse the position of valve 41 and to withdraw operating rod 44 rearwardly to inoperative position. Reversal of valve 41 causes the discharge of the upper ends of cylinders 33 through pipes 38, 40, and 92 to drain 85, and concurrently effects the charging of the lower ends of said cylinders through pipes 39, 42 and 91 from the hydraulic supply pipe 81. This causes cylinders 33 to elevate vulcanizer cover 11 to open the vulcanizer, strut 48 automatically moving into engagement with abutment 50 as the cover attains its uppermost position. The initial opening movement of cover 11 allows plunger 68 to rise off the operating lever of switch 67, causing the latter to open the electrical circuit to timer 65 and thereby causing the latter to come to rest. This completes a cycle of operation which may be repeated after the vulcanized article is removed from the vulcanizer and an unvulcanized article mounted therein.

From the foregoing it will be seen that the vulcanizer is substantially automatic in its operation, thus saving time and labor, and assuring that the product will be of uniform quality. The vulcanizer includes several safety features that afford protection against personal injury and property damage. The presence of the valve 100 in the control system enables two-way control of the valve 28 from a single control mechanism in the timer 65.

Modification may be resorted to without departing from the spirit of the invention, or the scope thereof as defined by the appended claims.

What is claimed is:

1. A vulcanizer of the character described, comprising a removable cover, an angularly movable locking ring for locking the cover in closed position, a timer for effecting cyclic operation of the various functions of the vulcanizer, said timer including a valve for controlling the admission of a pressure fluid to the work in the vulcanizer, and a valve arranged to be operated by said locking ring, said valves being in series and so arranged as to enable said pressure fluid to pass to the work only when the locking ring is in cover-locking position.

2. A vulcanizer of the character described comprising a removable cover, an angularly movable locking ring for locking said cover in closed position, a double acting fluid operated cylinder for moving said locking ring, a double-diaphragm valve having two way control for effecting the operation of said cylinder, said valve being pneumatically operated and having connection at one end with a source of operating fluid to maintain it in the position wherein the locking ring is in unlocked position, and having a second connection at its other end with a source of operating fluid to maintain it in the position wherein the locking ring is in locked position, a pilot valve in said first mentioned connection controlling the passage of fluid therethrough and including a connection with the second mentioned connection whereby the pilot valve is closed to effect reversal of the double-diaphragm valve when there is fluid pressure in the second mentioned connection, and a mechanically operated control valve controlling the flow of fluid in said second mentioned connection.

GEORGE P. BOSOMWORTH.